F. L. STUART.
CONVEYER BELT.
APPLICATION FILED OCT. 20, 1915.
1,175,190.
Patented Mar. 14, 1916.
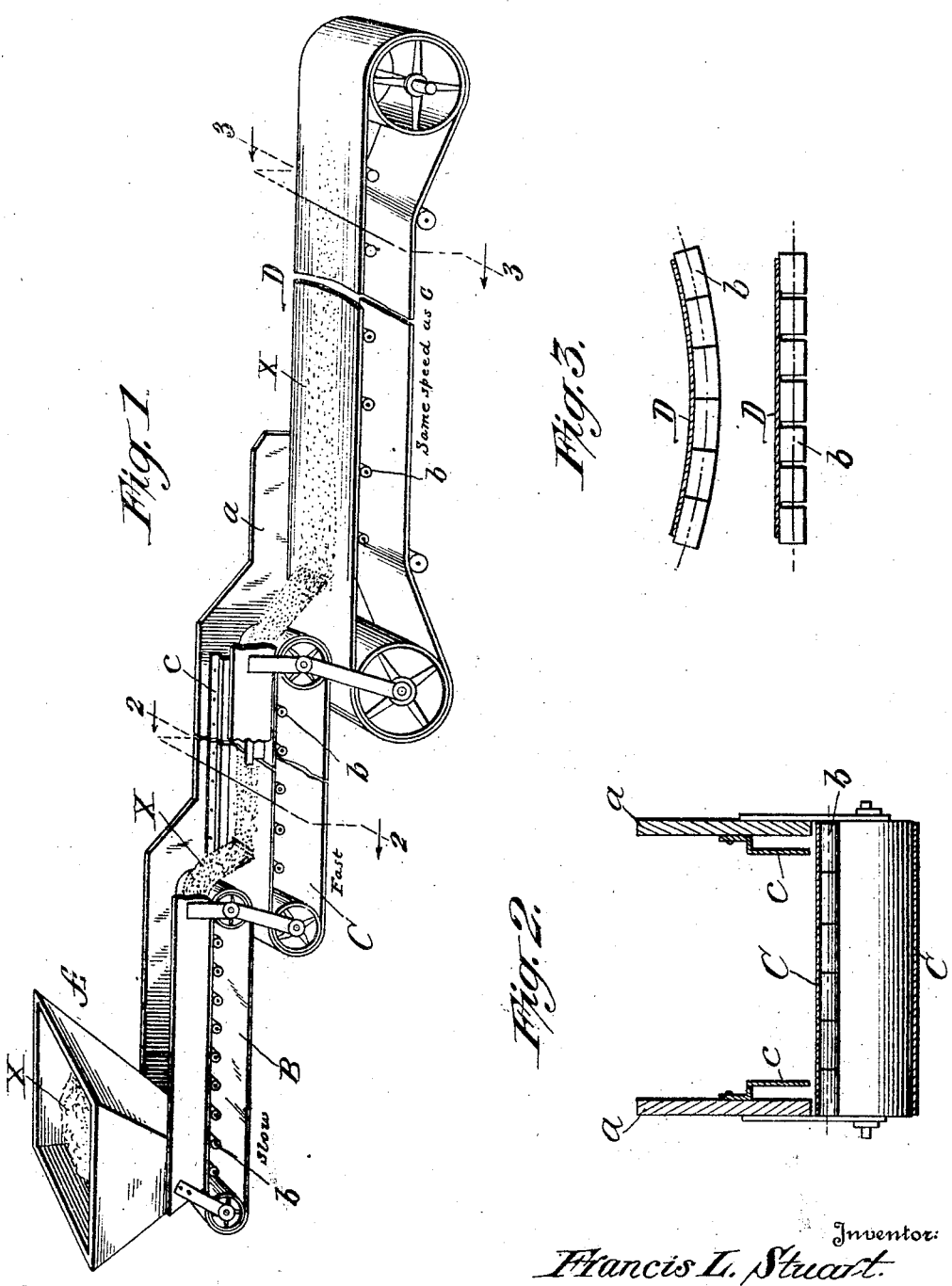
Inventor:
Francis L. Stuart.
Witnesses
P. J. Gathmann
E. B. Franzoni
By his Attorneys:
Baldwin & Wight

UNITED STATES PATENT OFFICE.

FRANCIS LEE STUART, OF BALTIMORE, MARYLAND.

CONVEYER-BELT.

1,175,190.  Specification of Letters Patent.  Patented Mar. 14, 1916.

Application filed October 20, 1915. Serial No. 56,907.

*To all whom it may concern:*

Be it known that I, FRANCIS LEE STUART, a citizen of the United States, residing in Baltimore, Maryland, have invented certain new and useful Improvements in Conveyer-Belts, of which the following is a specification.

This invention relates to conveyer belts of the kind employed for carrying coal, ore and other material from a source of supply to a place of delivery, and the object of my invention is to so organize a system of belts as to reduce the cost of maintenance and repair.

It is often necessary to convey the material a long distance. In the case of coal, for instance, the material is frequently delivered to a conveyer belt or to belts which carry it several hundred feet and often over a thousand feet. If a single belt is employed and the material is delivered from a hopper or a chute directly to such belt the wear thereon is very great, and when the belt is put out of commission and a new one required the expense and delay is very great. Heretofore these objections to the use of a single belt have been to some extent reduced by employing a short "feeder belt" which receives the material from a hopper or chute and delivers to the long conveyer belt. In this way the greatest wear occurs on the feeder belt, and this can be removed or replaced at comparatively small cost, but I have found that very improved results are obtained by employing two or more feeder belts so mounted and driven that the material is first delivered to a feeder moving at slow speed and delivering to another feeder moving at increased speed and which in turn delivers to a long conveyer belt or to other feeders moving at comparatively high speed. Preferably I employ two feeder belts, as usually these are sufficient, the first of which moves slowly and delivers to a second feeder which moves preferably at approximately the same speed as the main conveyer belt. In this way the greatest wear occurs on the first feeder which is short and may be renewed at comparatively small expense. The first feeder delivers to the second feeder in such manner that the material while in motion and having considerable trajectory falls upon the second belt with less force than it would if delivered vertically. Preferably the second feeder is made to travel at the same speed as the main conveyer so that the force of the impact of the material delivered to the main conveyer is reduced to a minimum. In this way the life of the main conveyer is greatly increased and the cost of maintenance largely reduced.

My improvements are illustrated in the accompanying drawings, in which—

Figure 1 is a perspective view of the conveyer belts arranged in accordance with my invention; the deflectors or chutes usually used or employed at the discharge end of the belts have been omitted and some parts of the skirt-boards have been broken away in order to illustrate certain details of construction. Fig. 2 shows a transverse section on the line 2—2 of Fig. 1. Fig. 3 shows a transverse section on the line 3—3 of Fig. 1.

The hopper A delivers to the first feeder B which delivers to the second feeder C, in turn delivering to the main conveyer D. The hopper merely represents means for delivering the material to the first feeder. Other means may, of course, be employed for this purpose.

The first feeder is mounted in a frame of any suitable construction and may be supported and driven in any suitable way. It should be driven at comparatively slow speed, say at the rate of 40-feet per minute. The second feeder, which may be either a flat or troughed belt and also be supported and driven in any suitable way, may be driven at a much greater speed, say at the rate of 500-feet per minute, while the main conveyer D is preferably driven at the same speed as that of the second conveyer. In this way the first feeder is subjected to the greatest wear and may be easily replaced at small expense. The second feeder is subjected to less wear than the first one because the material, indicated at X, is made to have a considerable trajectory in the direction of movement of the belts. The two feeders may be comparatively short, say from 12 to 20-feet in length, while the main conveyer belt may be several hundred feet long or even of greater length. If the second feeder is made to move at the same speed as the main conveyer the trajectory of the material leaving the second feeder will be very pronounced and its speed of movement will approximate that of the main conveyer so that as soon as material is delivered to the main conveyer it will without interruption, follow the latter and proceed with it. In this way the life of the main conveyer is prolonged and the expense of maintenance is greatly reduced.

The drawings show certain details of construction which are unimportant. The side boards or skirt boards $a$ are of the kind often employed in conveyers of similar construction and the supporting rollers $b$ are of the well known kind. The skirt boards $a$ are placed on opposite sides of the feeder belts and extend a short distance from the delivery end of the feeder on opposite sides of the main conveyer, which latter is curved transversely as indicated in order to retain the material during transit. $c$ indicates wearing plates or guards which are applied to the skirt boards in the same manner and for the same purpose as in other conveyers of the class to which my invention relates. It will be understood that I do not claim any material improvement in the details of construction of the apparatus illustrated.

I claim as my invention:—

1. A series of conveyer belts, comprising a feeder of short length driven at comparatively slow speed and which receives material from a source of supply, a conveyer belt of great length driven at a speed much greater than that of the first feeder, and an intermittent feeder of relatively short length driven at a speed much greater than that of the first feeder and which receives the material from the first feeder and delivers to the main conveyer belt.

2. A series of conveyer belts, comprising a feeder driven at comparatively slow speed and which receives material from a source of supply, a conveyer belt driven at a speed much greater than that of the first feeder, and an intermediate feeder driven at approximately the same speed as the main conveyer belt which receives the material from the first feeder and delivers to the main conveyer belt.

In testimony whereof, I have hereunto subscribed my name.

FRANCIS LEE STUART.

Witnesses:
E. R. SPARKS,
A. M. KINSMAN.